(12) United States Patent
Suh et al.

(10) Patent No.: US 10,651,463 B2
(45) Date of Patent: May 12, 2020

(54) NEGATIVE ELECTRODE ACTIVE MATERIAL AND METHOD OF PREPARING THE SAME

(71) Applicants: SAMSUNG SDI CO., LTD., Yongin-si, Gyeonggi-do (KR); MK ELECTRON CO., LTD., Yongin-si, Gyeonggi-do (KR); INDUSTRY-ACADEMIA COOPERATION GROUP OF SEJONG UNIVERSITY, Seoul (KR)

(72) Inventors: Soonsung Suh, Yongin-si (KR); Jaehyuk Kim, Yongin-si (KR); Jaemyung Kim, Yongin-si (KR); Kibuem Kim, Seoul (KR); Jeongtae Kim, Gimpo-si (KR); Seungwhan Lee, Seoul (KR); Yulsang Lee, Dangjin-si (KR); Jongsoo Cho, Seoul (KR); Sunghwan Hong, Daejeon (KR)

(73) Assignees: SAMSUNG SDI CO., LTD., Yongin-si, Gyeonggi-do (KR); MK ELECTRON CO., LTD., Yongin-si, Gyeonggi-do (KR); Industry-Academia Cooperation Group of Sejong University, Seoul (KR)

( * ) Notice: Subject to any disclaimer, the term of this patent is extended or adjusted under 35 U.S.C. 154(b) by 228 days.

(21) Appl. No.: 15/602,918

(22) Filed: May 23, 2017

(65) Prior Publication Data
US 2017/0346085 A1 Nov. 30, 2017

(30) Foreign Application Priority Data

May 24, 2016 (KR) .................. 10-2016-0063724

(51) Int. Cl.

| | |
|---|---|
| *H01M 4/38* | (2006.01) |
| *H01M 4/134* | (2010.01) |
| *H01M 10/0525* | (2010.01) |
| *B22D 13/02* | (2006.01) |
| *B22D 21/00* | (2006.01) |
| *B22F 9/00* | (2006.01) |

(Continued)

(52) U.S. Cl.
CPC .............. *H01M 4/38* (2013.01); *B22D 13/02* (2013.01); *B22D 21/007* (2013.01); *B22F 9/008* (2013.01); *B22F 9/04* (2013.01); *C22C 1/002* (2013.01); *C22C 1/02* (2013.01); *C22C 1/05* (2013.01); *C22C 28/00* (2013.01); *H01M 2/1653* (2013.01); *H01M 4/131* (2013.01); *H01M 4/134* (2013.01); *H01M 4/1395* (2013.01); *H01M 4/505* (2013.01); *H01M 4/525* (2013.01); *H01M 4/623* (2013.01); *H01M 4/625* (2013.01); *H01M 4/661* (2013.01); *H01M 10/0525* (2013.01); *B22F 2009/043* (2013.01); *B22F 2302/45* (2013.01); *B22F 2998/10* (2013.01); *H01M 4/0404* (2013.01); *H01M 4/0435* (2013.01); *H01M 4/0471* (2013.01); *H01M 4/1391* (2013.01); *H01M 10/0568* (2013.01); *H01M 10/0569* (2013.01); *H01M 2004/027* (2013.01); *H01M 2220/30* (2013.01); *H01M 2300/004* (2013.01); *H01M 2300/0034* (2013.01)

(58) Field of Classification Search
CPC ...... H01M 4/38; H01M 2/1653; H01M 4/131; H01M 4/134; H01M 4/1395; H01M 4/505; H01M 4/525; H01M 4/623; H01M 4/625; H01M 4/661; H01M 10/0525; H01M 2300/0034; H01M 4/0404; H01M 4/0435; H01M 4/0471; H01M 4/1391; H01M 10/0568; H01M 10/0569; H01M 2004/027; H01M 2220/30; H01M 2300/004; B22D 13/02; B22D 21/007; B22F 9/008; B22F 9/04; B22F 2009/043; B22F 2302/45; B22F 2998/10; C22C 1/002; C22C 1/02; C22C 1/05; C22C 28/00

See application file for complete search history.

(56) References Cited

U.S. PATENT DOCUMENTS

| | | | | |
|---|---|---|---|---|
| 6,555,272 B2 * | 4/2003 | Suzuki | ................ | H01M 4/134 429/217 |
| 6,730,434 B1 * | 5/2004 | Kawakami | ............. | C22C 45/00 429/218.1 |
| 7,498,100 B2 | 3/2009 | Christensen et al. | | |
| 7,906,238 B2 | 3/2011 | Le | | |
| 8,334,069 B2 | 12/2012 | Mizutani et al. | | |

(Continued)

FOREIGN PATENT DOCUMENTS

| | | |
|---|---|---|
| JP | 2002-042788 | 2/2002 |
| JP | 2010-003602 A | 1/2010 |

(Continued)

*Primary Examiner* — Muhammad S Siddiquee
(74) *Attorney, Agent, or Firm* — Lee IP Law, P.C.

(57) ABSTRACT

A negative electrode active material includes a silicon-based alloy represented by $Si-M_1-M_2-C-B$, wherein $M_1$ and $M_2$ are different from each other and are each independently selected from magnesium, aluminum, titanium, vanadium, chromium, iron, cobalt, nickel, copper, zinc, gallium, germanium, manganese, yttrium, zirconium, niobium, molybdenum, silver, tin, tantalum, and tungsten. In the silicon-based alloy, Si is in a range of about 50 at % to about 90 at %, $M_1$ is in a range of about 10 at % to about 50 atom %, and $M_2$ is in a range of 0 at % to about 10 at %, based on a total number of Si, $M_1$, and $M_2$ atoms. C is in a range of about 0.01 to about 30 parts by weight, and B is in a range of 0 to about 5 parts by weight, based on a total of 100 parts by weight of Si, $M_1$, and $M_2$.

16 Claims, 2 Drawing Sheets

(51) Int. Cl.

| | | |
|---|---|---|
| *B22F 9/04* | (2006.01) | |
| *C22C 1/00* | (2006.01) | |
| *C22C 1/02* | (2006.01) | |
| *C22C 1/05* | (2006.01) | |
| *C22C 28/00* | (2006.01) | |
| *H01M 2/16* | (2006.01) | |
| *H01M 4/131* | (2010.01) | |
| *H01M 4/1395* | (2010.01) | |
| *H01M 4/505* | (2010.01) | |
| *H01M 4/525* | (2010.01) | |
| *H01M 4/62* | (2006.01) | |
| *H01M 4/66* | (2006.01) | |
| *H01M 4/04* | (2006.01) | |
| *H01M 4/1391* | (2010.01) | |
| *H01M 10/0568* | (2010.01) | |
| *H01M 10/0569* | (2010.01) | |
| *H01M 4/02* | (2006.01) | |

(56) References Cited

U.S. PATENT DOCUMENTS

| | | | |
|---|---|---|---|
| 8,753,545 B2 | 6/2014 | Obrovac et al. | |
| 2009/0317716 A1* | 12/2009 | Mizutani | H01M 4/133 |
| | | | 429/200 |
| 2014/0332716 A1* | 11/2014 | Hong | H01M 4/386 |
| | | | 252/182.1 |

FOREIGN PATENT DOCUMENTS

| | | |
|---|---|---|
| KR | 2000-0023090 | 4/2000 |
| KR | 2009-0133073 | 12/2009 |
| KR | 10-2013-0088483 | 8/2013 |

* cited by examiner

NEGATIVE ELECTRODE ACTIVE MATERIAL AND METHOD OF PREPARING THE SAME

CROSS-REFERENCE TO RELATED APPLICATION

Korean Patent Application No. 10-2016-0063724, filed on May 24, 2016, in the Korean Intellectual Property Office, and entitled: "Negative Electrode Active Material and Method of Preparing the Same," is incorporated by reference herein in its entirety.

BACKGROUND

1. Field

One or more embodiments relate to a negative electrode active material and a method of preparing the same.

2. Description of the Related Art

A lithium battery is used to provide power to drive a portable electronic device such as a video camera, a cell phone, or a laptop computer. A rechargeable lithium secondary battery has an energy density per weight 3 times higher than those of conventional lead-acid batteries, nickel-cadmium batteries, nickel-hydrogen batteries, or nickel-zinc batteries, and may be rapidly charged.

A lithium secondary battery provides electrical energy by oxidation and reduction reactions when lithium ions are intercalated/deintercalated at a positive electrode and a negative electrode while an organic electrolyte solution or a polymer electrolyte solution is filled between the positive electrode and the negative electrode that include active materials capable of intercalating and deintercalating lithium ions.

SUMMARY

Embodiments are directed to a negative electrode active material including a silicon-based alloy. The silicon-based alloy is represented by Si-$M_1$-$M_2$-C—B, wherein $M_1$ and $M_2$ are different from each other and are each independently selected from magnesium (Mg), aluminum (Al), titanium (Ti), vanadium (V), chromium (Cr), iron (Fe), cobalt (Co), nickel (Ni), copper (Cu), zinc (Zn), gallium (Ga), germanium (Ge), manganese (Mn), yttrium (Y), zirconium (Zr), niobium (Nb), molybdenum (Mo), silver (Ag), tin (Sn), tantalum (Ta), and tungsten (W). In the silicon-based alloy, an amount of Si is in a range of about 50 atom % to about 90 at %, an amount of $M_1$ is in a range of about 10 at % to about 50 atom %, and an amount of $M_2$ is in a range of 0 at % to about 10 at %, based on a total number of Si, $M_1$, and $M_2$ atoms, and an amount of C is in a range of about 0.01 parts by weight to about 30 parts by weight, and an amount of B is in a range of 0 parts by weight to about 5 parts by weight, based on a total of 100 parts by weight of Si, $M_1$, and $M_2$.

A Turbiscan stability index (TSI) of the negative electrode active material may be 10 or less.

The silicon-based alloy may include a matrix that includes at least one of a Si-$M_1$ alloy phase and a Si-$M_2$ alloy phase, and a Si single phase dispersed in the matrix. C and B may each be independently disposed on a surface of or inside the silicon-based alloy.

C and B may be disposed on a surface of and inside the silicon-based alloy.

The Si-$M_1$ alloy phase and the Si-$M_2$ alloy phase may be a crystalline phase.

The Si single phase may be an amorphous phase.

$M_1$ and $M_2$ may each be independently selected from the group consisting of Mn and Fe.

$M_1$ may be Fe and $M_2$ may be Mn.

Some of C of the silicon-based alloy may exist in the form of SiC or amorphous carbon.

An amount of B may be in a range of about 0.01 parts by weight to about 5 parts by weight.

Some of B of the silicon-based alloy may exist in the form of a silicide.

An average particle diameter (D50) of the silicon-based alloy may be in a range of about 1 μm to about 7 μm.

Embodiments are also directed to a negative electrode for a lithium battery including a negative electrode current collector and a negative electrode active material on at least one surface of the negative electrode current collector, the negative electrode active material being the negative electrode active material as described above.

The negative electrode may further include a binder between the negative electrode current collector and the negative electrode active material layer or in the negative electrode active material layer.

The binder may be at least one aqueous binder selected from a fluorine-based acrylate, a polyethylene-based acrylate, a polypropylene-based acrylate, a polytetrafluoroethylene, a styrene-butadiene rubber, an acrylated styrene-butadiene rubber, a polyvinyl alcohol, a sodium polyacrylic acid, a propylene-olefin copolymer having 2 to 8 carbon atoms, and a copolymer of (meth)acrylic acid and (meth)acrylic acid alkyl ester.

Embodiments are also directed to a lithium battery including a positive electrode, the negative electrode as described above, and a separator between the positive electrode and the negative electrode.

Embodiments are also directed to a method of preparing the negative electrode active material as described above, including preparing a mother alloy having a composition including Si in a range of about 50 at % to about 90 at %, $M_1$ in a range of about 10 at % to about 50 at %, and, selectively, $M_2$ in a range of 0 at % to about 10 at %, rapidly cooling and solidifying a melt of the mother alloy to obtain a rapidly cooled and solidified alloy, and pulverizing the rapidly cooled and solidified alloy to prepare a silicon-based alloy. The method may further include adding C- and B-containing materials respectively including an amount of C in a range of about 0.01 parts to about 30 parts by weight and an amount of B in a range of more than 0 parts to about 5 parts by weight to the mother alloy and/or the silicon-based alloy during the preparing of a mother alloy and/or the pulverizing of the rapidly cooled and solidified alloy to prepare a silicon-based alloy.

Rapid solidifying of the mother alloy may be performed by melt spinning.

The B-containing material may be selected from boron (B), boric acid ($H_3BO_3$), boric carbide ($B_4C$), ferro-boron, boric nitride BN, and a mixture thereof.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
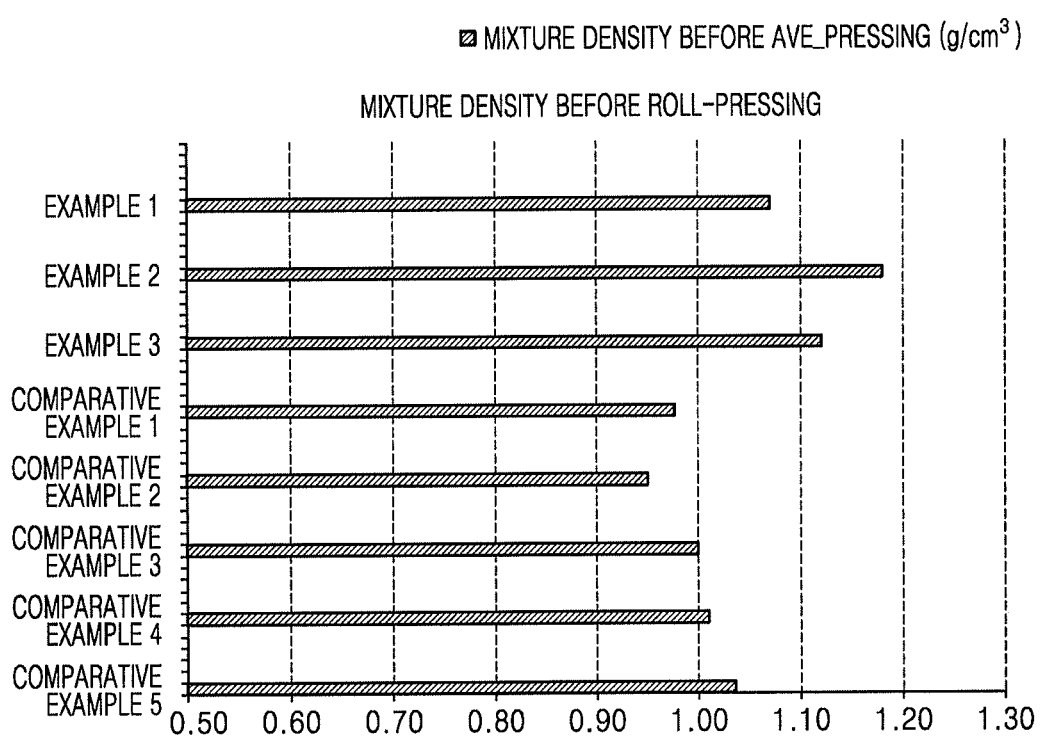
FIG. 1 illustrates a graph of densities of negative electrodes prepared in Examples 1 to 3 and Comparative Examples 1 to 5.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Hereinafter, an embodiment will be described in detail. As used herein, an atomic percent (at %) represents the number of atoms of a corresponding component occupied in the total number of the whole material, expressed as a percent.

As used herein, the term "Turbiscan stability index" (TSI) refers to an index represented by a numerical value of dispersion stability. A higher Turbiscan stability index denotes a lower dispersion stability. A method of calculating the Turbiscan stability index is generally known in the art. Accordingly, a detailed description thereof is not repeated herein. The index may be calculated according to Equation 1.

$$d_i = \frac{\sum_h |\text{scan}_i(h) - \text{scan}_{i-1}(h)|}{H} \quad \langle \text{Equation 1} \rangle$$

($d_i$: a distance between profiles measured in time; H: a height of a sample determined by a user; $\text{scan}_i(h)$: a measured height)

As a negative electrode active material of a lithium battery, a silicon-based alloy and various types of carbonaceous materials may be used. Here, the term "silicon-based" in "silicon-based alloy" denotes that at least about 50 at % of silicon is included in the alloy based on the total number of atoms of the alloy. When the negative electrode active material includes the silicon-based alloy, a battery having a high capacity compared to a carbonaceous negative electrode active material may be manufactured. The term "alloy" in "silicon-based alloy" denotes a composition that is a silicon-containing composite including a metal or a non-metal in addition to Si and having a constant composition.

The silicon-based alloy for a negative electrode active material may be prepared mainly by using a melt spin process to limit crystal growth of silicon and allow silicon to be evenly precipitated in a matrix material. The silicon-based alloy produced from the process may be configured to allow silicon particles to be precipitated in the center of the matrix structure and allow the matrix surrounding the silicon to serve as a buffer layer so that a volume change of silicon during charging/discharging of a battery may be tolerable. An alloy phase that serves as a matrix may be generally inactive to electrochemical reactions of a battery, and the silicon particles precipitated in the matrix may be active to electrochemical reactions of a battery. Here, the term "inactive" denotes no participation in intercalation/deintercalation of lithium ions during charging/discharging of a battery, and the term "active" denotes participation in intercalation/deintercalation of lithium ions during charging/discharging of a battery. Active silicon particles in general may undergo a large volume change during charging/discharging such that the active material including a silicon-based alloy may be damaged or a conducting path between the active materials may be cut off after several cycles of charging/discharging. Due to such issues, cycle lifespan characteristics of a battery including general active silicon particles may deteriorate.

In this regard, embodiments address the issue of volume change by providing a silicon-based alloy that includes B in a matrix containing C. Thus, a volume change of silicon particles may be minimized despite repeated charging/discharging of a battery, and thus lifespan characteristics of a lithium battery including the silicon-based alloy as an active material may be improved.

According to an embodiment, a negative electrode active material includes a silicon-based alloy represented by $Si-M_1-M_2-C-B$. Here, C represents carbon, and B represents boron.

$M_1$ and $M_2$ may be each independently selected from magnesium (Mg), aluminum (Al), titanium (Ti), vanadium (V), chromium (Cr), iron (Fe), cobalt (Co), nickel (Ni), copper (Cu), zinc (Zn), gallium (Ga), germanium (Ge), manganese (Mn), yttrium (Y), zirconium (Zr), niobium (Nb), molybdenum (Mo), silver (Ag), tin (Sn), tantalum (Ta), and tungsten (W). For example, $M_1$ and $M_2$ may be each independently selected from Mn and Fe. For example, $M_1$ may be Fe, and $M_2$ may be Mn.

Amounts of elements included in the silicon-based alloy may be as follows.

Based on a total number of Si, $M_1$, and $M_2$ atoms, an amount of Si may be in a range of about 50 at % to about 90 at %, an amount of $M_1$ may be in a range of about 10 at % to about 50 at %, and an amount of $M_2$ may be in a range of 0 at % to about 10 at %.

For example, based on the total number of Si, $M_1$, and $M_2$ atoms, an amount of Si may be in a range of about 70 at % to about 90 at %, an amount of $M_1$ may be in a range of about 10 at % to about 30 at %, and an amount of $M_2$ may be in a range of 0 at % to about 5 at %.

For example, based on the total number of Si, $M_1$, and $M_2$ atoms, an amount of Si may be in a range of about 70 at % to about 90 at %, an amount of $M_1$ may be in a range of about 10 at % to about 30 at %, and an amount of $M_2$ may be in a range of about 0.01 at % to about 5 at %.

For example, based on the total number of Si, $M_1$, and $M_2$ atoms, an amount of Si may be in a range of about 70 at % to about 90 at %, an amount of $M_1$ may be in a range of about 10 at % to about 30 at %, and an amount of $M_2$ may be in a range of about 1 at % to about 5 at %.

Here, when the amount of $M_1$ is greater than 50 at %, an amount of Si in the silicon alloy is reduced such that a desired high level of battery capacity of may not be exhibited. Also, silicon carbide (SiC), in which Si and C are combined, is formed, and due to the reduction of an amount of reversible Si, a battery capacity may decrease.

Also, based on a total of 100 parts by weight of Si, $M_1$, and $M_2$, an amount of C may be in a range of about 0.01 parts to 30 parts by weight, and an amount of B may be in a range of greater than 0 parts to about 5 parts by weight or less.

For example, based on a total of 100 parts by weight of Si, $M_1$, and $M_2$, an amount of C may be in a range of about 0.01 parts to 30 parts by weight, and an amount of B may be in a range of about 0.01 parts to about 5 parts by weight or less.

The silicon-based alloy may be represented by Formula 1:

  <Formula 1>

$[Si_a(M_1)_b(M_2)_c]C_dB_e$

In Formula 1, each of $M_1$ and $M_2$ may be at least one selected from Mg, Al, Ti, V, Cr, Fe, Co, Ni, Cu, Zn, Ga, Ge, Mn, Y, Zr, Nb, Mo, Ag, Sn, Ta, and W, where a, b, c, d, and e satisfy an atomic ratio of $50 \le a \le 90$, $10 \le b \le 50$, and $0 \le c \le 10$; and a weight ratio of $0.01 \le d \le 30$ and $0 \le e \le 5$.

A Turbiscan stability index (TSI) of the negative electrode active material may be in a range of 0 to about 10. Even if a negative electrode active material maintains the same metal and non-metal compositions and content ratios, when a Turbiscan stability index is greater than 10, lifespan characteristics of a battery including the negative electrode active material may significantly deteriorate compared to lifespan characteristics of a negative electrode active material having a Turbiscan stability index (TSI) not greater than 10.

The silicon-based alloy may include a matrix and a Si single phase dispersed in the matrix. For example, the matrix may form an interface with the Si single phase, may surround the Si single phase, and thus may decrease the volume change of silicon during charging/discharging of a lithium battery. The Si single phase may be a phase formed from Si nanoparticles. The Si single phase may be active in a chemical reaction of a battery. For example, the silicon-based alloy may be capable of intercalation/deintercalation of lithium ions during charging/discharging of a battery due to the active Si nanoparticles. Volume expansion of the Si nanoparticles may be buffered by the inactive matrix that surrounds the active Si nanoparticles.

The matrix may include at least one of a Si-$M_1$ alloy phase and a Si-$M_2$ alloy phase. For example, the matrix may include both the Si-$M_1$ alloy phase and the Si-$M_2$ alloy phase. The Si-$M_1$ alloy phase and the Si-$M_2$ alloy phase may each be a crystalline phase. For example, the Si-$M_1$ alloy phase and the Si-$M_2$ alloy phase may respectively be formed of an intermetallic compound having Si and $M_1$ or an intermetallic compound having Si and $M_2$, each combined according to a simple integer ratio. Whether or not the Si-$M_1$ alloy phase and the Si-$M_2$ alloy phase are a crystalline phase may be determined according to a diffraction peak corresponding to the Si-$M_1$ alloy phase and/or the Si-$M_2$ alloy phase in an X-ray diffraction spectrum of the silicon-based alloy. For example, when the Si-$M_1$ alloy phase and the Si-$M_2$ alloy phase are a crystalline phase, peaks corresponding to each crystal face of the Si-$M_1$ alloy phase and/or the Si-$M_2$ alloy phase may appear in the X-ray diffraction spectrum of the silicon-based alloy.

The Si single phase may be an amorphous phase. In this case, a peak with respect to the Si single phase may not appear in the X-ray diffraction spectrum of the silicon-based alloy. For example, a peak with respect to a crystal face (111) at a diffraction angle (2θ) of 28.5+/−0.5° may not appear when the Si single phase in the X-ray diffraction spectrum of the silicon-based alloy (using a Cu-Kα ray of 1.5406 Å) is an amorphous phase.

When the silicon-based alloy has a structure in which a crystalline matrix surrounds the amorphous active phase, stress caused by expansion of Si nanoparticles during charging of a lithium battery may be reduced compared to a structure in which an amorphous matrix surrounds an amorphous active phase. Also, a conductive pathway between Si nanoparticles may be secured by a crystalline matrix that is more brittle than an amorphous matrix.

In the silicon-based alloy, C and B may each independently be included in the silicon-based alloy or may be disposed on a surface of the silicon-based alloy.

For example, each of C and B may be continuously disposed or may be disposed non-continuously as an island type on a surface of the alloy. Here, the term "island" type refers to a shape of a sphere, a hemisphere, or a non-sphere, or an irregular shape having a predetermined volume, as examples. Each of C and B disposed on a surface of the alloy may exist uncombined with another element.

In some implementations, each of C and B may be present between the Si-$M_1$ alloy phase and the Si-$M_2$ alloy phase in the silicon-based alloy. Each of C and B may be present between the Si single phase and the Si-$M_1$ alloy phase or between the Si single phase and the Si-$M_2$ alloy phase in the silicon-based alloy. For example, each of C and B may be located in or may be absent from pores, and thus may reduce the number of pores in the silicon-based alloy, or, for example, in the matrix of the silicon-based alloy.

Some of C in the silicon-based alloy may exist in the form of SiC or amorphous carbon. For example, during a process of preparing the silicon-based alloy, C may react with Si and thus form SiC or may exhibit an amorphous phase. Accordingly, the silicon-based alloy may include SiC and/or amorphous carbon.

To include C in the silicon-based alloy, a C-containing material that is added in the preparation process of the silicon-based alloy may be crystalline carbon, amorphous carbon, or a mixture thereof. An example of crystalline carbon is graphite, such as natural graphite or artificial graphite, carbon black, carbon whisker, or pitch-based carbon fibers, in shapeless, plate, flake, spherical, or fibrous form. Examples of the amorphous carbon include soft carbon or hard carbon. For example, the C-containing material may be natural graphite or artificial graphite in flake form. The crystalline carbon may form SiC or may be converted to amorphous carbon during the preparation process of the silicon-based alloy.

When an amount of C in the silicon-based alloy is in a range of about 0.01 parts to about 30 parts by weight based on a total of 100 parts by weight of Si, $M_1$, and $M_2$, expansion of Si nanoparticles may be suppressed by C located in and/or on the silicon-based alloy. Thus, side reaction sites with an electrolyte solution may decrease due to a reduction of pores in the matrix. Also, C on the alloy may contribute to an improvement of electrical conductivity of a negative electrode.

Some of B in the silicon-based alloy may exist in the form of a silicide. For example, during a preparation process of the silicon-based alloy, B may react with Si and thus form a silicide such as $SiB_4$ or $SiB_6$. Accordingly, the silicon-based alloy may include a silicide such as $SiB_4$ or $SiB_6$ as well as B itself.

A B-containing material that is added in the preparation process of the silicon-based alloy may be boron (B), boric acid ($H_3BO_3$), boric carbide ($B_4C$), ferro-boron, boric nitride (BN), or mixtures thereof during the preparation process of the silicon-based alloy so that B may be included in the silicon-based alloy. For example, the B-containing material that is added in the preparation process of the silicon-based alloy may be boric acid having a layered structure. The boric acid may have a structure including stacked layers of a lamellar structure including $H_3BO_3$ bonded by a hydrogen bond. The boric acid having the layered structure may have a structure similar to that of graphite, and thus, may be ductile compared to Si, $M_1$, and $M_2$. Accordingly, when boric acid having the layered structure is mixed with Si, $M_1$, and $M_2$ during the preparation process of the silicon alloy, amorphization of Si nanoparticles may be promoted, and thus dispersibility of the silicon-based alloy may increase.

When carbon (C) exists on a surface as well as an inside the silicon-based alloy, the silicon-based alloy may exhibit hydrophobicity. When boric acid having the layered structure is added to the silicon-based alloy exhibiting hydrophobicity, the surface of the silicon-based alloy may be modified to be hydrophilic by a hydroxyl group of boric acid. Thus, a mixing property with an aqueous binder may increase. In this regard, dispersibility of silicon-based alloy particles may increase.

For example, when B is included in the silicon-based alloy, dispersibility of the silicon-based alloy may increase. Thus, a density of a negative electrode active material layer including the silicon-based alloy may increase. Here, the term "density of an active material layer" refers to a weight per volume of an active material layer. The term "density of an active material layer" may also be known as a mixture density, which denotes a standard of a degree to which an electrode plate is pressed during a roll-pressing process.

When an amount of B in the silicon-based alloy is in a range of greater than 0 parts to about 5 parts by weight, or, for example, in a range of about 0.01 parts to about 5 parts by weight, based on a total of 100 parts by weight of Si, $M_1$, and $M_2$, a density of a negative electrode active material layer may be increased according to an increase of dispersibility of the silicon-based alloy, but electrical resistance of a negative electrode may not increase. Therefore, lifespan characteristics of a lithium battery including the silicon-based alloy may be improved.

According to an embodiment, an average particle diameter (D50) of the silicon-based alloy may be in a range of about 1 μm to about 7 μm. For example, an average particle diameter (D50) of the silicon-based alloy may be in a range of about 1 μm to about 6 μm. For example, an average particle diameter (D50) of the silicon-based alloy may be in a range of about 2 μm to about 5 μm.

As used herein, the average particle diameter "D50" denotes a cumulative average particle diameter that corresponds to 50 vol % in a cumulative distribution curve of a particle diameter having the total volume as 100%. D50 may be measured by using a method known in the art. An example of the method may include measuring using a particle size analyzer or obtaining a measurement from a transmission electron microscopy (TEM) or scanning electron microscopy (SEM) image. In some embodiments, the method may include measuring dynamic light-scattering using a meter, performing data analysis to count the number of particles with respect to each size range, such that a D50 value may be easily obtained from the resulting calculation.

As described above, even when negative electrode active materials are formed of the same metal and non-metal compositions and amounts, battery characteristics including lifespan characteristics may vary depending on the Turbiscan stability index. A negative electrode active material having a Turbiscan stability index within an appropriate range may be obtained by controlling the D50 value of the silicon-based alloy.

The negative electrode active material may include the silicon-based alloy described above as an essential component and may further include a negative electrode active material generally used in a lithium battery.

Examples of the additional negative electrode active material may include graphite capable of intercalating and deintercalating lithium ions, a carbonaceous material such as carbon, a lithium metal, an alloy, a silicon oxide-based material, or a mixture thereof.

According to an embodiment, a silicon-based alloy and a carbonaceous material may be used as a negative electrode active material. Examples of the carbonaceous material may include natural graphite, artificial graphite, graphene, carbon black, fullerene soot, carbon nanotubes, carbon fibers, soft carbon, hard carbon, pitch carbide, mesophase pitch carbide, and calcined cokes. A combination of at least two selected therefrom may be used as a negative electrode active material.

In this regard, when a carbonaceous material is used together with the silicon-based alloy, oxidation of the silicon-based alloy may be suppressed. Thus, a solid electrolyte interphase (SEI) layer may be effectively formed. In this regard, a stable layer may be formed, and electrical conductivity may be improved, which may further improve charging/discharging characteristics of lithium.

When the carbonaceous material is used, the carbonaceous material may be, for example, mixed and blended with the silicon-based alloy or may be coated on a surface of the silicon-based alloy.

An amount of the negative electrode active material used together with the silicon-based alloy may be in a range of about 1 wt % to about 99 wt % based on the total weight of the silicon-based alloy and the negative electrode active material.

When the silicon-based alloy is a major component in the negative electrode active material, an amount of the silicon-based alloy may be, for example, in a range of about 90 wt % to about 99 wt % based on the total amount of the negative electrode active material and the silicon-based alloy. When graphite or pitch, which is amorphous carbon, is used as the negative electrode active material, the graphite or pitch may be coated on a surface of the silicon-based alloy.

When the silicon-based alloy is a minor component in the negative electrode active material, an amount of the silicon-based alloy may be, for example, in a range of about 1 wt % to about 10 wt % based on the total amount of the negative electrode active material and the silicon-based alloy. When graphite or pitch is used as the negative electrode active material, the graphite or pitch may serve as a buffer of the silicon-based alloy, and thus the lifespan of an electrode may be improved.

Hereinafter, a method of preparing a negative electrode active material including the silicon-based alloy will be described.

According to an embodiment, the method of preparing a negative electrode active material may include preparing a mother alloy having a composition of Si in a range of about 50 at % to about 90 at %, $M_1$ in a range of about 10 at % to about 50 at %, and, optionally, $M_2$ in a range of 0 at % to about 10 at %, rapidly cooling and solidifying a melt of the mother alloy to obtain a rapidly cooled and solidified alloy, and pulverizing the rapidly cooled and solidified alloy to prepare a silicon-based alloy.

The method further may further include adding C- and B-containing materials, respectively including an amount of C in a range of about 0.01 parts to about 30 parts by weight and an amount of B in a range of more than 0 parts to about 5 parts by weight, to the mother alloy and/or to the silicon-based alloy during the preparing of a mother alloy and/or the pulverizing of the rapidly cooled and solidified alloy to prepare a silicon-based alloy.

Here, an at % range of B that provides an amount of B in a range of 0 parts to about 5 parts by weight may be in a range of 0 at % to about 1.49 at %.

The mother alloy may be prepared by a suitable method. For example, the mother alloy may be prepared by a vacuum induction melting method, an arc melting method, or a mechanical alloying method. For example, a vacuum induction melting method melts the mother alloy in a vacuum so as to minimize oxidation by air.

Raw materials for preparing the silicon-based alloy may have a suitable form to satisfy a necessary constitution ratio. For example, in order to mix elements that constitute the silicon-based alloy to a desired composition ratio, elements, alloys, solid solutions, or intermetallic compounds may be used.

For example, as described above, the C-containing material added during the preparation process of the silicon-based alloy may be crystalline carbon, amorphous carbon, or a mixture thereof, such that C may be included in the silicon-based alloy. The B-containing material added during the preparation process of the silicon-based alloy may be boron (B), boric acid ($H_3BO_3$), boric carbide ($B_4C$), ferro-boron, boric nitride (BN), or mixtures thereof, such that B may be included in the silicon-based alloy.

For example, elemental metal powders may be measured and mixed to a desired alloy composition ratio. The mixture may be converted into a mother alloy of the silicon-based alloy by using a vacuum induction melting furnace, which is a device that melts a metal having a high melting temperature by high frequency induction. In the initial melting process, an inside of the vacuum induction melting furnace may be prepared to have a vacuum state, and an inert gas such as Ar may be injected into the inside of vacuum induction melting furnace, such that oxidation of the prepared mother alloy may be prevented or reduced.

Next, the mother alloy thus prepared may be melted, and the melt may undergo a rapid cooling and solidification process. The rapid cooling and solidification process may be performed by a suitable method, for example, by a melt spinning method, a gas atomization method, or a strip cast method. Through the rapid cooling and solidification process, an alloy having silicon nanoparticles evenly distributed in the matrix may be formed.

The rapid cooling and solidification process may be performed by a melt spinning method. For example, the melt of the mother alloy may be rapidly cooled and solidified while being ejected onto a wheel that rapidly rotates by a melt spinner device using high frequency induction. The rapid cooling and solidification process may include rapid cooling of the melt of the mother alloy at a rate in a range of about $10^3$ K/sec to about $10^7$ K/sec.

The melt of the mother alloy may be cooled by the rapidly rotating wheel and thus may be ejected in a ribbon shape, the ribbon shape and a size of silicon nanoparticles distributed in the alloy being determined by a cooling rate. For example, in order to obtain fine silicon nanoparticles, the melt may be cooled at a cooling rate of about 1,000° C./second or higher. In order to obtain homogeneous silicon nanoparticles, a thickness of the ejected resultant alloy having a ribbon shape may be controlled to be, for example, in a range of about 5 μm to about 20 μm, or, for example, in a range of about 7 μm to about 16 μm.

The rapidly cooled and solidified alloy, which is the ejected resultant alloy having a ribbon shape produced by the rapid cooling and solidification process, may be pulverized into a powder form and thus may be used as a negative electrode active material. D50 of the pulverized alloy powder may be in a range of about 1 μm to about 7 μm. The pulverizing technique may be performed by a suitable method. For example, a device used in the pulverizing process may be an atomizer, a vacuum mill, a ball mill, a planetary ball mill, a beads mill, or a jet mill. The pulverizing process may be performed for about 6 hours to about 48 hours.

The pulverizing process may be a dry pulverizing process or a wet pulverizing process.

According to another aspect of an embodiment, a negative electrode may include a negative electrode current collector and a negative electrode active material layer disposed on at least one surface of the negative electrode current collector and including the negative electrode active material described above.

A density of the negative electrode active material layer may be in a range of about 1.4 $g/cm^3$ to about 1.7 $g/cm^3$. The density of the negative electrode active material layer may be measured from a negative electrode plate that is finally prepared after a roll-pressing process. A density of the negative electrode active material layer before the roll-pressing process may be in a range of about 1.0 $g/cm^3$ to about 1.2 $g/cm^3$. For example, a density of the negative electrode active material layer before the roll-pressing process may be in a range of about 1.0 $g/cm^3$ to about 1.18 $g/cm^3$. When the density of the negative electrode active material layer is within these ranges, dispersibility of the negative electrode active material included in the negative electrode active material layer may be excellent. A density of the negative electrode active material layer that is finally prepared after the roll-pressing process may be in a range of about 1.4 $g/cm^3$ to about 1.7 $g/cm^3$, and a lithium battery including the negative electrode active material layer may have improved lifespan characteristics.

According to an embodiment, a lithium battery may include the negative electrode. For example, the lithium battery according to an embodiment may include a negative electrode including the negative electrode active material, a positive electrode disposed so as to face the negative electrode, and an electrolyte disposed between the negative electrode and the positive electrode.

The negative electrode and a lithium battery including the negative electrode may be prepared as follows.

The negative electrode may include the negative electrode active material described above. For example, the negative electrode active material, a binder, and, optionally, a conducting material, may be mixed together in a solvent to prepare a negative electrode active material composition, and then the negative electrode active material composition may be molded in a predetermined shape or may be coated onto a current collector such as a copper foil.

The binder used in the negative electrode active material composition may be a component that contributes to binding between the negative electrode active material and a conducting material or binding with respect to a current collector. The binder may be included between the negative electrode current collector and the negative electrode active material layer, or in the negative electrode active material layer, in an amount in a range of about 1 part to about 30 parts by weight based on 100 parts by weight of the negative electrode active material. For example, the binder may be added in an amount in a range of about 1 part to about 30 parts by weight, about 1 part to about 20 parts by weight, or about 1 part to about 15 parts by weight based on 100 parts by weight of the negative electrode active material. Examples of the binder may include a suitable polymer such as polyvinylidene fluoride (PVdF), polyvinylidene chloride, polybenzimidazole, polyimide, polyvinyl acetate, polyacrylonitrile, polyvinyl alcohol, carboxymethylcellulose (CMC), starch, hydroxypropylcellulose, reproduced cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenyl sulfide, polyamideimide, polyetherimide, polyethylene sulfone, polyamide, polyacetal, polyphenylene oxide, polybutylene terephthalate, ethylene-propylene-diene monomer (EPDM), sulfonated EPDM, styrene-butadiene rubber (SBR), fluorine rubber, or a combination thereof.

In some implementations, the binder may be an aqueous binder that is at least one selected from polyacrylamide, a polymer formed of a copolymer of alkylene and unsaturated dicarboxylic acid, a fluorine-based acrylate, polyethylene-based acrylate, polypropylene-based acrylate, polytetrafluoroethylene, styrene-butadiene rubber, acrylate styrene-butadiene rubber, polyvinylalcohol, sodium polyacrylic acid, a copolymer of propylene and olefin having 2 to 8 carbon atoms, and a copolymer of (meth)acrylic acid and (meth)acrylic acid alkylester. The negative electrode active material according to an embodiment may have good aqueous dispersibility. Accordingly, when the negative electrode active material is used together with the aqueous binder, the negative electrode active material composition may be easily coated on a current collector, which may increase battery lifespan characteristics. Also, compared to when an organic-based binder is used, a separate process for removing an organic material is not required when the aqueous binder is used. Thus, using the aqueous binder may improve manufacturability and reduce a manufacture cost of a battery.

The negative electrode may selectively further include a conducting material to improve an electrical conductivity by providing a conducting pathway to the negative electrode active material. The conducting material may be a suitable material for use as a conducting material in a lithium battery. Examples of the conducting material may include a carbonaceous material such as carbon black, acetylene black, ketjen black, or carbon fibers (e.g., vapor growth carbon fibers), a metallic material such as a metal powder or metal fibers of copper, nickel, aluminum, or silver, or a conductive material including a conductive polymer such as a polyphenylene derivative or a mixture thereof. An amount of the conducting material may be appropriately controlled. For example, a weight ratio of the negative electrode active material and the conducting material may be in a range of about 99:1 to about 90:10.

Examples of the solvent may include N-methylpyrrolidone (NMP), acetone, or water. An amount of the solvent may be in a range of about 1 part to about 10 parts by weight based on 100 parts by weight of the negative electrode active material. When the amount of the solvent is within this range, an active material layer may be easily formed.

A thickness of the current collector may be in a range of about 3 μm to about 500 μm The current collector may be made of a suitable material that does not cause a chemical change to a battery and has high conductivity. Examples of the current collector for a negative electrode may include copper, stainless steel, aluminum, nickel, titanium, calcined carbon, copper, and stainless steel that are surface-treated with carbon, nickel, titanium, or silver, and an aluminum-cadmium alloy. The current collector may have an uneven microstructure at its surface to enhance a binding force with the negative electrode active material. The current collector may be used in various forms including a film, a sheet, a foil, a net, a porous body, a foaming body, or a non-woven body.

As examples, the negative electrode active material composition may be directly coated onto a current collector, or the negative electrode active material composition may be cast onto a separate support to form a negative electrode active material film, which may then be separated from the support and laminated onto a copper foil current collector to prepare a negative electrode plate.

In more detail, the negative electrode active material may be directly coated onto the current collector to form a negative electrode plate, or may be cast onto a separate support and a negative electrode active material film separated from the support is laminated onto a copper current collector to form a negative electrode plate.

In addition to being used in manufacturing a lithium battery, the negative electrode active material composition may be printed onto a flexible electrode substrate to manufacture a printable battery.

For the manufacture of a positive electrode, a positive electrode active material composition may be prepared by mixing a positive electrode active material, a conducting material, a binder, and a solvent.

The positive electrode active material may be a suitable material used as a positive electrode active material in the art. For example, the positive electrode actual material may be a compound represented by one of the following formulae: $Li_aA_{1-b}B'_bD'_2$ (where $0.90 \leq a \leq 1$, and $0 \leq b \leq 0.5$); $Li_aE_{1-b}B'_bO_{2-c}D'_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$, and $0 \leq c \leq 0.05$); $Li_aNi_{1-b-c}Co_bB'_cD'_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB'_cD'_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB^1_cO_{2-\alpha}F^1_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 \leq \alpha \leq 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$, and $0.001 \leq b \leq 0.1$); $Li_aCoG_bO_2$ (where $0.90 \leq a \leq 1$, and $0.001 \leq b \leq 0.1$); $Li_aMnG_bO_2$ (where $0.90 \leq a \leq 1$, and $0.001 \leq b \leq 0.1$); $Li_aMn_2G_bO_4$ (where $0.90 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-1)}J_2(PO_4)_3$ (where $0 \leq f \leq 2$); $Li_{(3-1)}Fe_2(PO_4)_3$ (where $0 \leq f \leq 2$); and $LiFePO_4$.

In the formulae above, A may be selected from nickel (Ni), cobalt (Co), manganese (Mn), and combinations thereof; B may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

In some embodiments, the cathode active material may be $LiCoO_2$, $LiMn_xO_{2x}$ (where x=1 or 2), $LiNi_{1-x}Mn_xO_{2x}$ (where $0 \leq x \leq 1$), $LiNi_{1-x-y}Co_xMn_yO_2$ (where $0 \leq x \leq 0.5$ and $0 \leq y \leq 0.5$), or $LiFePO_4$.

The conducting material, the binder, and the solvent used to prepare the positive electrode active material composition may be the same as those included in the negative electrode active material composition. In some implementations, a plasticizer may be further added to the positive electrode active material composition and to the negative electrode active material composition in order to form pores in a corresponding electrode plate. Amounts of the positive electrode active material, the conducting material, the binder, and the solvent may be the same as those used in a conventional lithium battery.

A positive electrode current collector may have a thickness of about 3 μm to about 500 μm. The positive electrode current collector may be made of a suitable material that does not cause a chemical change to a battery and has high conductivity. Examples of the current collector for a positive electrode may include stainless steel, aluminum, nickel, titanium, calcined carbon, or aluminum and stainless steel that are surface-treated with carbon, nickel, titanium, or silver. The current collector for a positive electrode may have an uneven microstructure at its surface to enhance a binding force with the positive electrode active material. The current collector may be used in various forms including a film, a sheet, a foil, a net, a porous body, a foaming body, and a non-woven body.

The positive electrode active material thus prepared may be directly coated onto the current collector for a positive electrode to form a positive electrode plate, or may be cast onto a separate support to form a positive electrode active material film that is then separated from the support and laminated onto the current collector for a positive electrode to form a positive electrode plate.

The positive electrode and the negative electrode may be separated by a separator The separator may be a suitable separator used in a lithium battery. For example, the separator may include a material that has a low resistance to migration of ions of an electrolyte and an excellent electrolytic solution-retaining capability. For example, the separator may include a material selected from glass fiber, polyester, Teflon, polyethylene, polypropylene, polytetrafluoroethylene (PTFE), and a combination thereof, each of which may be non-woven or woven. The separator may have a pore diameter in a range of about 0.01 μm to about 10 μm and a thickness in a range of about 5 μm to about 300 μm.

A lithium salt-containing non-aqueous electrolyte may include a non-aqueous electrolyte solution and lithium. Examples of the non-aqueous electrolyte may include a non-aqueous electrolyte solution, a solid electrolyte, and an inorganic solid electrolyte.

The non-aqueous electrolyte solution may be an aprotic organic solvent. Examples of the aprotic organic solvent may include N-methyl-2-pyrrolidone, propylene carbonate, ethylene carbonate, butylene carbonate, dimethyl carbonate, diethyl carbonate, fluorinated ethylene carbonate, ethylene methylene carbonate, methylpropyl carbonate, ethyl propanoate, methyl acetate, ethyl acetate, propyl acetate, dimethylester gamma-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, polyester sulfide, polyvinyl alcohols, polyvinylidene fluoride, and polymers containing ionic dissociation groups.

Examples of the inorganic solid electrolyte may include nitrides, halides, and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt may be a suitable lithium salt used in a lithium battery and soluble in the non-aqueous electrolyte. For example, the lithium salt may include at least one selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenyl borate, and lithium imide.

Lithium batteries may be classified as lithium ion batteries, lithium ion polymer batteries, and lithium polymer batteries according to the types of a separator and an electrolyte used therein. In addition, lithium batteries may be classified as a cylindrical type, a rectangular type, a coin type, and a pouch type according to a battery shape, and may also be classified as a bulk type and a thin type according to a battery size. Lithium batteries may be also used either as primary lithium batteries or secondary lithium batteries.

The lithium battery may include a positive electrode, a negative electrode, and a separator between the positive electrode and the negative electrode. In some embodiments, the positive electrode, the negative electrode, and the separator may be wound or folded, and then sealed in a battery case. The battery case may be filled with an electrolyte and sealed with a cap assembly, thereby completing the manufacture of the lithium battery. In some embodiments, the battery case may be a cylindrical type, a rectangular type, or a thin-film type. For example, the lithium battery may be a lithium ion battery.

The lithium secondary battery may be a winding type or a stack type according to a configuration of electrodes or may be classified into a cylindrical type, a rectangular type, a coin type, and a pouch type according to a type of the external material.

The lithium battery may be prepared by a method well understood by one of ordinary skill in the art.

The lithium battery may be suitable to be used as a battery acting as a power source for small-sized devices such as mobile phones or portable computers, or as a unit battery of a battery module including a plurality of batteries in a medium-to-large-sized device.

Examples of the medium-to-large-sized device may include a power tool, an xEV such as an electric vehicle (EV), a hybrid electric vehicle (HEY), and a plug-in hybrid electric vehicle (PHEV), an electric bicycle such as an e-bike or an e-scooter, an electric golf cart, an electric truck, an electric commercial vehicle, or an electric power storage system, as examples. The lithium battery may be suitable for a use requiring a high output, a high voltage, and high temperature operability.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Negative Electrode

Example 1

First, 85 at % of Si, 13 at % of Fe, 2 at % of Mn, and $H_3BO_3$ having a layered structure were mixed so that an amount of B in the finally produced silicon-based alloy was 1 part by weight per 100 parts by weight of the total amount of Si, Fe, and Mn, and the mixture was added to a vacuum induction melting furnace (available from Yein Tech., Korea). Then, in order to minimize oxidation by air, the mixture was melted in a vacuum to prepare a mother alloy.

The mother alloy thus prepared was pulverized into coarse particles, the resultant particles were put into an ejection tube of a melt spinner (available from Yein Tech., Korea), the mother alloy particles were heated and melted in an argon gas atmosphere with high frequency induction, the melted mother alloy was sprayed onto a rotating Cu wheel through a nozzle, and the alloy was ejected in the shape of a ribbon and rapidly solidified.

While pulverizing the resultant alloy ribbons for 20 hours by using a ball mill, 20 parts by weight of graphite (available from Aekyung Petrochemical Co., Ltd) per 100 parts by weight of the total amount of Si, Fe, and Mn was added and then pulverized for 4 hours to obtain a silicon-based alloy. The silicon-based alloy was used as a negative electrode active material.

The negative electrode active material, an aqueous binder (available from Aekyung Chemicals) prepared by mixing polyacrylamide and poly(isobutylene-co-maleic acid) at a weight ratio of about 3:7 as a binder, and a carbon conducting material (Denka Black) as a conducting material were mixed at a weight ratio of 96:1.5:2.5, and pure water was added as a solvent to control the viscosity of the mixture so that an amount of solid in the mixture was 45 weight %, thereby completing preparation of a negative electrode active material composition.

The negative electrode active material composition was coated to a thickness of about 40 μm onto a copper current collector having a thickness of about 15 μm by using the method described above. The current collector coated with the composition was dried at room temperature, dried again at 120° C., and roll-pressed and punched to prepare a negative electrode to be applied to a 18650-type cell.

Example 2

A negative electrode was prepared in the same manner as in Example 1, except that $H_3BO_3$ having a layered structure was added to the silicon-based alloy so that an amount of B in the silicon-based alloy was 3 parts by weight based on 100 parts by weight of the total amount of Si, Fe, and Mn.

Example 3

A negative electrode was prepared in the same manner as in Example 1, except that $H_3BO_3$ having a layered structure was added to the silicon-based alloy so that an amount of B in the silicon-based alloy was 5 parts by weight based on 100 parts by weight of the total amount of Si, Fe, and Mn.

Comparative Example 1

A negative electrode was prepared in the same manner as in Example 1, except that $H_3BO_3$ and graphite were not added.

Comparative Example 2

A negative electrode was prepared in the same manner as in Example 1, except that 80 at % of Si, 10 at % of Ti, and 10 at % of Ni were added instead of 85 at % of Si, 13 at % of Fe, and 2 at % of Mn, and $H_3BO_3$ and graphite were not added.

Comparative Example 3

A negative electrode was prepared in the same manner as in Example 1, except that $H_3BO_3$ was not added, and 15 parts by weight of graphite was added instead of 20 parts by weight of graphite per 100 parts by weight of the total amount of Si, Fe, and Mn.

Comparative Example 4

A negative electrode was prepared in the same manner as in Example 1, except that $H_3BO_3$ was not added.

Comparative Example 5

A negative electrode was prepared in the same manner as in Example 1, except that $H_3BO_3$ was not added, and 15 parts by weight of graphite was added instead of 20 parts by weight of graphite per 100 parts by weight of the total amount of Si, Fe, and Mn.

Preparation of Lithium Secondary Battery

Example 4

Preparation of Positive Electrode $LiNi_{1/3}Co_{1/3}Mn_{1/3}O_2$ as a positive electrode active material, PVDF as a binder, and a carbon conducting material (Denka Black) as a conducting material were mixed at a weight ratio of 90:5:5, and N-methylpyrrolidone as a solvent was added to control a viscosity of the mixture so that an amount of solid was 60 weight %, thereby completing preparation of a positive electrode active material composition.

By using the method described above, of the positive electrode active material composition was coated to a thickness of about 40 μm onto an aluminum current collector having a thickness of about 15 μm. The current collector coated with the composition was dried at room temperature, dried again at 120° C., and roll-pressed and punched to prepare a positive electrode to be applied to a 18650-type cell.

Preparation of Lithium Secondary Battery—Full Cell

A polypropylene separator having a thickness of 14 μm was placed between the positive electrode and the negative electrode prepared in Example 1, and an electrolyte was injected between the positive electrode and the negative electrode and pressed to prepare a 18650-type cell. The electrolyte was prepared by dissolving $LiPF_6$ at a concentration of 1.10 M in a solvent mixture including ethylene carbonate (EC), diethyl carbonate (DEC), and fluoroethylene carbonate (FEC) at a volume ratio of 5:70:25 (EC:DEC:FEC).

Example 5

A lithium secondary battery was prepared in the same manner as in Example 4, except that the negative electrode prepared in Example 2 was used instead of the negative electrode prepared in Example 1.

Example 6

A lithium secondary battery was prepared in the same manner as in Example 4, except that the negative electrode prepared in Example 3 was used instead of the negative electrode prepared in Example 1.

Comparative Example 6

A lithium secondary battery was prepared in the same manner as in Example 4, except that the negative electrode prepared in Comparative Example 1 was used instead of the negative electrode prepared in Example 1.

Comparative Example 7

A lithium secondary battery was prepared in the same manner as in Example 4, except that the negative electrode prepared in Comparative Example 2 was used instead of the negative electrode prepared in Example 1.

Comparative Example 8

A lithium secondary battery was prepared in the same manner as in Example 4, except that the negative electrode prepared in Comparative Example 3 was used instead of the negative electrode prepared in Example 1.

Comparative Example 9

A lithium secondary battery was prepared in the same manner as in Example 4, except that the negative electrode prepared in Comparative Example 4 was used instead of the negative electrode prepared in Example 1.

Comparative Example 10

A lithium secondary battery was prepared in the same manner as in Example 4, except that the negative electrode prepared in Comparative Example 5 was used instead of the negative electrode prepared in Example 1.

Evaluation Example 1: Measurement of Density of Negative Electrode Active Material Layer In order to confirm dispersibility of the silicon-based alloy according to addition of B with respect to the negative electrodes prepared in Examples 1 to 3 and Comparative Examples 1 to 5, densities of the negative electrode active material layers before a roll-pressing process were measured by using a MDH-25 device (available from Mitutoyo, and the results are shown in FIG. 1.

As shown in FIG. 1, it may be shown that densities of the negative electrode active material layers (in the order of Comparative Example 4, Example 1, Example 2, and Example 3) increase as an amount of B added to the silicon-based alloy increases. That is, as dispersibility of the silicon-based alloy increases according to the addition of B, alloy particles become more evenly distributed in the active material layers.

Evaluation Example 2: Evaluation of Lifespan Characteristics of Lithium Secondary Battery The lithium secondary batteries prepared in Examples 4 to 6 and Comparative Examples 6 to 10 were charged at 25° C. at a current of 1.0 C rate with a constant current mode (CC mode) until a charging cutoff voltage of 4.2 V (vs. Li) was reached. Then, while maintaining a voltage at 4.2 V, the batteries were charged with a constant voltage mode (CV mode) until the current was a 0.01 C rate. Subsequently, the batteries were discharged with a CC mode of 0.2 C until a discharging cutoff voltage of 2.5 V was reached, and initial charging/discharging efficiencies of the batteries were measured.

Next, charging/discharging efficiency measurement was repeated until a $100^{th}$ cycle.

In the charging/discharging cycles, the batteries were rested for 10 minutes after each charging/discharging cycle.

Figure 2:
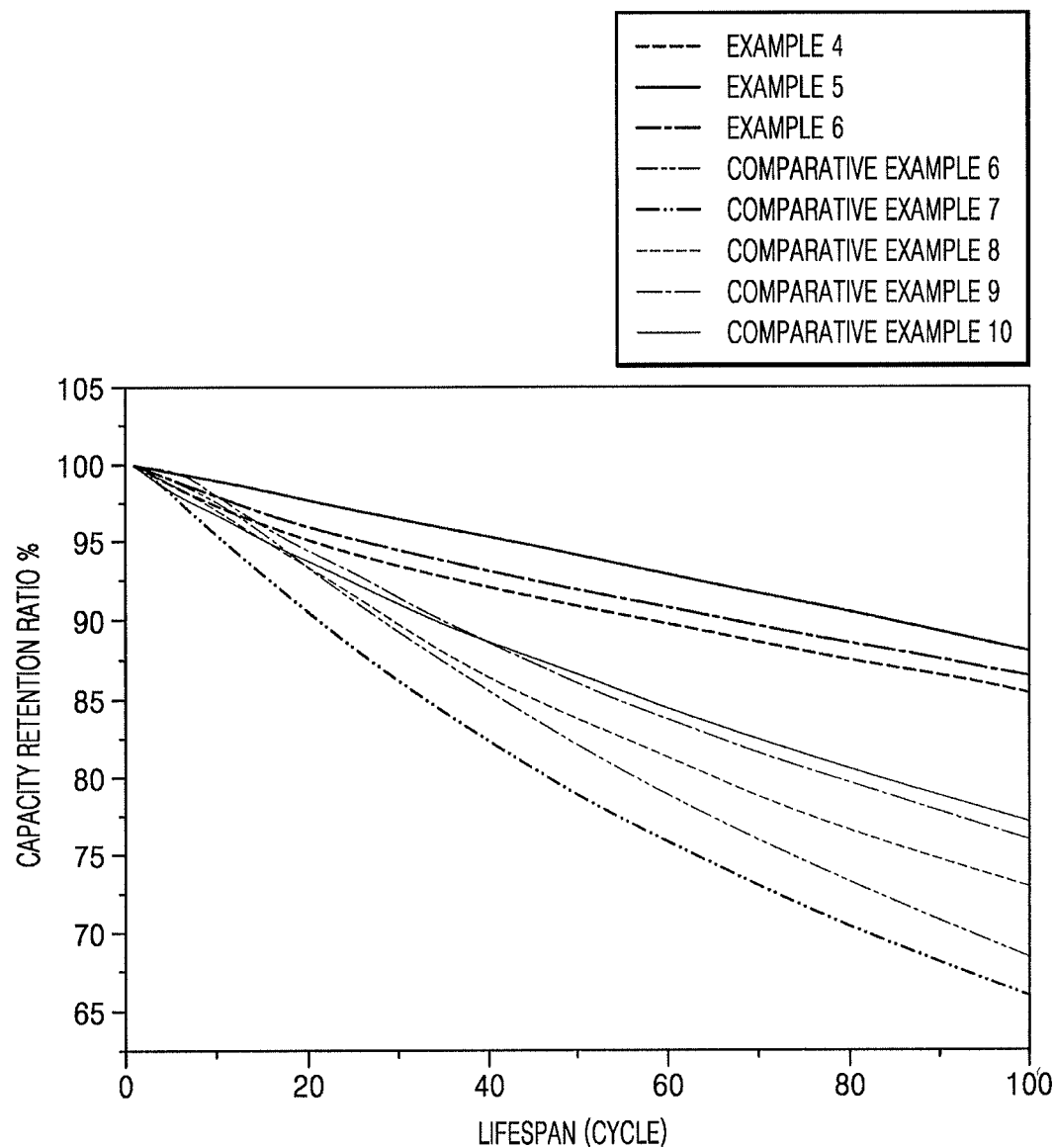
FIG. 2 illustrates a graph of lifespan characteristics of lithium secondary batteries prepared in Examples 4 to 6 and Comparative Examples 6 to 10.

The measured initial charging/discharging efficiencies and the results of the charging/discharging test are shown in Table 1 and FIG. 2. Here, an initial charge/discharge efficiency (ICE) is defined according to Equation 2, and a capacity retention ratio (CRR) is defined according to Equation 3.

$$\text{Initial charging/discharging efficiency [\%]} = [\text{Initial discharging capacity/initial charging capacity}] \times 100 \qquad \text{Equation 2}$$

$$\text{Capacity retention ratio [\%]} = [\text{Discharge capacity at each cycle/discharge capacity at the } 1^{st} \text{ cycle}] \times 100 \qquad \text{Equation 3}$$

TABLE 1

| | Composition ratio (at %) | | | C (Parts by weight*) | B (Parts by weight*) | ICE (%) | $100^{th}$ CRR (%) |
|---|---|---|---|---|---|---|---|
| | Si | Fe | Mn | | | | |
| Example 4 | 85 | 13 | 2 | 20 | 1 | 85 | 84 |
| Example 5 | 85 | 13 | 2 | 20 | 3 | 88 | 88 |
| Example 6 | 85 | 13 | 2 | 20 | 5 | 86 | 85 |
| Comparative Example 6 | 85 | 13 | 2 | | | 87 | 68 |
| Comparative Example 7 | Si: 80 | Ti: 10 | Ni: 10 | | | 90 | 65 |
| Comparative Example 8 | 85 | 13 | 2 | 15 | | 85 | 72 |
| Comparative Example 9 | 85 | 13 | 2 | 20 | | 84 | 76 |
| Comparative Example 10 | 85 | 13 | 2 | 30 | | 82 | 77 |

(*Amounts of C and B are each measured based on 100 parts by weight of the total amount of Si, Fe, and Mn.)

As shown in Table 1 and FIG. 2, the lithium batteries containing C at an amount of 20 parts by weight and B at an amount of up to 5 parts by weight (Examples 4 to 6) showed improved lifespan characteristics compared to those of the lithium batteries without C and B (Comparative Examples 6 and 7). Also, the lithium batteries containing B at an amount of 5 parts by weight (Examples 4 and 6) had improved lifespan characteristics compared to those of lithium batteries without B but containing C at a predetermined number of parts by weight (Comparative Examples 8 to 10). Therefore, it may be confirmed that providing both C and B in the negative electrode active material contributes to an improvement of lifespan characteristics.

Further, the lithium batteries including the silicon-based alloy represented by Si—Fe—Mn—C—B (Examples 4 to 6) exhibited lifespan characteristics that were significantly improved as compared with the lifespan characteristics of the lithium battery including only Si—Ti—Ni (Comparative Example 7), which is believed to be as a result of composite effects caused by the combination of elements that constitute the silicon-based alloy.

By way of summation and review, in general, theoretical capacities of batteries may vary according to the type of electrode active materials, but charging and discharging capacities generally deteriorate as the number of cycles increases. The major cause of this phenomenon is believed to be that the active materials do not function due to an increase in an internal resistance due to separation between the electrode active materials or the electrode active material and a current collector, where the increase in the internal resistance is caused by a volume change of electrodes generated as charging and discharging of a battery proceeds. Also, when the lithium ions intercalated in the negative electrode are not properly released during the intercalation and deintercalation process, an active point of the negative electrode may decrease. In this regard charging/discharging capacity and lifespan characteristics of the battery may deteriorate according to the increase of the number of cycles.

For example, when a general silicon (Si)-based active material having a high theoretical capacity of 3580 mAh/g at room temperature is used as an active material to increase a discharge capacity, a volume of the active material may significantly increase by almost 300% as charging and discharging proceed. An electrode mixture slurry may be dislocated from an electrode plate, which may ultimately result in a rapid deterioration of the battery capacity after several to several tens of cycles.

When an aqueous binder is used in preparation of a general electrode mixture slurry to be applied on the electrode plate, a desired level of aqueous dispersion stability may not be obtained, and thus the battery lifespan characteristics may deteriorate.

Accordingly, in this regard, an electrode mixture that provides improved strength of adhesion to a current collector and improved battery performance by controlling volume expansion of an electrode active material that occurs during a repeated charging/discharging process is desirable. In this regard, efforts to improve such an active material, such as by formation of an alloy with a metal such as tin to reduce a volume change, reduction of a Si ratio in the form of SiO, and preparation of a buffer layer have not provided sufficient aqueous dispersion stability of a silicon-based active material, and thus a secondary battery that may exhibit lifespan characteristics of the desired level has not been developed.

Embodiments provide an active material having a high theoretical capacity and capable of improving lifespan characteristics of a battery by improving aqueous dispersion stability. For example, embodiments provide a negative electrode active material including a silicon-based alloy including predetermined amounts of C and B.

Embodiments provide a negative electrode including the negative electrode active material.

Embodiments provide a lithium battery with improved lifespan characteristics including the negative electrode.

Embodiments further provide a method of preparing the negative electrode active material.

As described above, according to one or more embodiments, a lithium battery may include a negative electrode active material including a silicon-based alloy that includes predetermined amounts of C and B, and thus lifespan characteristics of the lithium battery may improve.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A negative electrode active material comprising a silicon-based alloy, wherein:
   the silicon-based alloy is represented by Si-$M_1$-$M_2$-C—B, wherein $M_1$ and $M_2$ are different from each other and are each independently selected from magnesium (Mg), aluminum (Al), titanium (Ti), vanadium (V), chromium (Cr), iron (Fe), cobalt (Co), nickel (Ni), copper (Cu), zinc (Zn), gallium (Ga), germanium (Ge), manganese (Mn), yttrium (Y), zirconium (Zr), niobium (Nb), molybdenum (Mo), silver (Ag), tin (Sn), tantalum (Ta), and tungsten (W),
   in the silicon-based alloy, an amount of Si is in a range of about 50 atom % to about 90 at %, an amount of $M_1$ is in a range of about 10 at % to about 50 at %, and an amount of $M_2$ is in a range of 0 at % to about 10 at %, based on a total number of Si, $M_1$, and $M_2$ atoms, and an amount of C is in a range of about 0.01 parts by weight to about 30 parts by weight, and an amount of B is in a range of 0 parts by weight to about 5 parts by weight, based on a total of 100 parts by weight of Si, $M_1$, and $M_2$,
   the silicon-based alloy includes:
   a matrix that includes at least one of a Si-$M_1$ alloy phase and a Si-$M_2$ alloy phase, and
   a Si single phase dispersed in the matrix, and
   C and B are each independently disposed on a surface of or inside the silicon-based alloy.

2. The negative electrode active material as claimed in claim 1, wherein a Turbiscan stability index (TSI) of the negative electrode active material is 10 or less.

3. The negative electrode active material as claimed in claim 1, wherein C and B are disposed on a surface of and inside the silicon-based alloy.

4. The negative electrode active material as claimed in claim 1, wherein the Si-$M_1$ alloy phase and the Si-$M_2$ alloy phase are a crystalline phase.

5. The negative electrode active material as claimed in claim 1, wherein the Si single phase is an amorphous phase.

6. The negative electrode active material as claimed in claim 1, wherein $M_1$ and $M_2$ are each independently selected from Mn and Fe.

7. The negative electrode active material as claimed in claim 1, wherein $M_1$ is Fe and $M_2$ is Mn.

8. The negative electrode active material as claimed in claim 1, wherein some of C of the silicon-based alloy exists in the form of SiC or amorphous carbon.

9. The negative electrode active material as claimed in claim 1, wherein an amount of B is in a range of about 0.01 parts by weight to about 5 parts by weight.

10. The negative electrode active material as claimed in claim 1, wherein some of B of the silicon-based alloy exists in the form of a silicide.

11. The negative electrode active material as claimed in claim 1, wherein an average particle diameter (D50) of the silicon-based alloy is in a range of about 1 μm to about 7 μm.

12. A negative electrode for a lithium battery, the negative electrode comprising:
- a negative electrode current collector; and
- a negative electrode active material on at least one surface of the negative electrode current collector, the negative electrode active material being the negative electrode active material as claimed in claim 1.

13. The negative electrode as claimed in claim 12, further comprising a binder between the negative electrode current collector and the negative electrode active material layer or in the negative electrode active material layer.

14. The negative electrode as claimed in claim 13, wherein the binder is at least one aqueous binder selected from a fluorine-based acrylate, a polyethylene-based acrylate, a polypropylene-based acrylate, a polytetrafluoroethylene, a styrene-butadiene rubber, an acrylated styrene-butadiene rubber, a polyvinyl alcohol, a sodium polyacrylic acid, a propylene-olefin copolymer having 2 to 8 carbon atoms, and a copolymer of (meth)acrylic acid and (meth)acrylic acid alkyl ester.

15. A lithium battery, comprising:
- a positive electrode;
- the negative electrode as claimed in claim 12; and
- a separator between the positive electrode and the negative electrode.

16. The negative electrode active material as claimed in claim 1, wherein the amount of C is in a range of more than about 19.8 parts by weight less or about 30 parts by weight, and an amount of B is in a range of more or 0 parts by weight less than about 4.9 parts by weight, based on a total of 100 parts by weight of Si, $M_1$, and M.

* * * * *